United States Patent [19]

Valyocsik

[11] Patent Number: 4,562,166

[45] Date of Patent: Dec. 31, 1985

[54] SYNTHESIS OF DODECASIL-1H WITH A METHYLAZABICYCLONONANIUM DIRECTING AGENT

[75] Inventor: Ernest W. Valyocsik, Yardley, Pa.

[73] Assignee: Mobil Oil Corporation, New York, N.Y.

[21] Appl. No.: 673,056

[22] Filed: Nov. 19, 1984

[51] Int. Cl.$^4$ .................... C01B 33/28; B01J 29/28
[52] U.S. Cl. ................................. 502/62; 423/328; 423/329; 502/77
[58] Field of Search ................... 423/328–330; 502/60, 62, 77

[56] References Cited

U.S. PATENT DOCUMENTS

| | | | |
|---|---|---|---|
| 3,459,676 | 8/1969 | Kerr | 423/328 X |
| 4,259,306 | 3/1981 | Pelrine | 423/328 X |
| 4,287,166 | 9/1981 | Dwyer et al. | 423/325 |
| 4,331,643 | 5/1982 | Rubin et al. | 423/329 |
| 4,372,930 | 2/1983 | Short et al. | 423/326 |
| 4,427,786 | 1/1984 | Miale et al. | 502/77 |
| 4,481,177 | 11/1984 | Valyocsik | 423/329 |
| 4,508,837 | 4/1985 | Zones | 502/62 |
| 4,510,526 | 4/1985 | Zones | 502/62 |

OTHER PUBLICATIONS

Lok et al., Zeolites, vol. 3, 1983, pp. 282–291.

*Primary Examiner*—Edward J. Meros
*Attorney, Agent, or Firm*—Alexander J. McKillop; Michael G. Gilman; Edward F. Kenehan, Jr.

[57] ABSTRACT

There is provided a method and a reaction mixture for preparing the zeolite, Dodecasil-1H, with a methylazabicyclononanium directing agent. There is also provided the Dodecasil-1H zeolite in as-synthesized form prepared by this method.

15 Claims, No Drawings

SYNTHESIS OF DODECASIL-1H WITH A METHYLAZABICYCLONONANIUM DIRECTING AGENT

BACKGROUND

This invention is related to the preparation of the zeolite, Dodecasil-1H, with a methylazabicyclononanium directing agent.

Dodecasil-1H is a member of a group of zeolites designated "the Clathrate Group" by Barrer. Note R. M. Barrer, Hydrothermal Chemistry of Zeolites (1982), Academic Press, 111 Fifth Avenue, New York, p. 19, the entire disclosure of which is expressly incorporated herein by reference. Other members of the group are the rare mineral melanophlogite, discovered by von Lasaux in 1876, and ZSM-39. ZSM-39 is described in the Dwyer et al. U.S. Pat. No. 4,287,166, the entire disclosure of which is incorporated herein by reference.

A drawing is given in H. Gerke, H. Gies, and F. Liebau (1982), Dodecasil-1H: Der Einfachste Vertreter einer Polytypen Reihe von $Sio_2$-Clathraten, Zeitschrift fuer Kristallographie, 159, 52-53, the entire disclosure of which is expressly incorporated herein by reference, from which a model of Dodecasil-1H can be constructed. From this model a hypothetical X-ray diffraction pattern corresponding to Dodecasil-1H can be constructed.

Dodecasil-1H is felt to have the same utility as ZSM-39, e.g., as a catalyst or as a sorbent.

SUMMARY

According to aspects of the invention, there are provided a method and a reaction mixture for preparing a Dodecasil-1H zeolite which method comprises preparing a mixture capable of forming said zeolite, said mixture comprising sources of alkali or alkaline earth metal ions, an oxide of aluminum, an oxide of silicon, a methylazabicyclononanium cation and water, said mixture having a composition in terms of moles of ions or oxides, falling within the following ranges:

| Reactants | Useful | Preferred |
|---|---|---|
| $SiO_2/Al_2O_3$ | 200-infinity | 300-20,000 |
| $H_2O/SiO_2$ | 5-200 | 20-100 |
| $OH^-/SiO_2$ | 0-0.80 | 0.05-0.40 |
| $M/SiO_2$ | 0.01-2.0 | 0.10-1.0 |
| $R/SiO_2$ | 0.01-2.0 | 0.05-1.0 | wherein R is the methylazabicyclononanium cation and M is the alkali or alkaline earth metal ion, said method further comprising maintaining said mixture under sufficient conditions until said zeolite is formed.

According to another aspect of the invention, there is provided a synthetic crystalline zeolite material Dodecasil-1H in the as-synthesized form having a formula, in terms of moles of oxides, in the anhydrous state as follows:

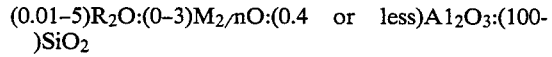

$(0.01-5)R_2O:(0-3)M_{2/n}O:(0.4$ or less$)Al_2O_3:(100-)SiO_2$ where R is a methylazabicyclononanium cation, M is an alkali or alkaline earth metal ion and n is the valence of M.

DESCRIPTION OF SPECIFIC EMBODIMENTS

The original alkali metal cations of the as synthesized Dodecasil-1H can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the Dodecasil-1H catalytically active, especially for hydrocarbon conversion. Replacing cations include hydrogen, rare earth metals and metals of Groups IA, IIA, IIIA, IVA, IB, IIB, IIIB, IVB and VIII of the Periodic Table of the Elements.

A typical ion exchange technique would be to contact the synthetic Dodecasil-1H with a salt of the desired replacing cation or cations. Examples of such salts include the halides, e.g. chlorides, nitrates and sulfates.

Dodecasil-1H can be used either in the alkali metal form, e.g. the sodium or potassium form; the ammonium form; the hydrogen form or another univalent or multivalent cationic form. When used as a catalyst the zeolite will be subjected to thermal treatment to remove part or all of the organic constituent.

The zeolite can also be used as a catalyst in intimate combination with a hydrogenating component such as tungsten, vanadium, molybdenum, rhenium, nickel, cobalt, chromium, manganese, or a whole metal such as platinum or palladium where a hydrogenation-dehydrogenation function is to be performed. Such component can be exchanged into the composition to the extent atom Y, e.g., aluminum, is in the structure, impregnated therein or intimately physically admixed therewith. Such component can be impregnated in or onto it such as for example, by, in the case of platinum, treating the zeolite with a solution containing a platinum metal-containing ion. Thus, suitable platinum compounds include chloroplatinic acid, platinous chloride and various compounds containing the platinum amine complex.

Dodecasil-1H, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

Dodecasil-1H, when employed either as an adsorbent or as a catalyst in an organic compound conversion process should be dehydrated, at least partially. This can be done by heating to a temperature in the range of e.g., 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing Dodecasil-1H in a vacuum, but a longer time is required to obtain a sufficient amount of dehydration.

Dodecasil-1H can be prepared from a reaction mixture containing sources of alkali metal ions (M), an oxide of aluminum, an oxide of silicon, a methylazabicyclononanium cation (R), and water. The reaction mixture may comprise an appropriate Dodecasil-1H formation selection of reactants, having a composition, in terms of mole ratios of ions and oxides, falling within the following ranges:

| Reactants | Useful | Preferred |
| --- | --- | --- |
| $SiO_2/Al_2O_3$ | 200-infinity | 300-20,000 |
| $H_2O/SiO_2$ | 5-200 | 20-100 |
| $OH^-/SiO_2$ | 0-0.80 | 0.05-0.40 |
| $M/SiO_2$ | 0.01-2.0 | 0.10-1.0 |
| $R/SiO_2$ | 0.01-2.0 | 0.05-1.0 | wherein R and M are as above defined.

The methylazabicyclononanium cation,

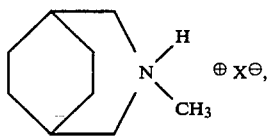

of the examples hereinafter was synthesized by refluxing 3-azabicyclo[3.2.2]nonane (available from Aldrich Chemical Co.) with excess methyliodide in absolute ethanol solvent. Yellow product crystals separate from the solvent as the reaction progresses. The reaction mixture was finally quenched in dry ice-acetone bath to −20° C., then the product was filtered on a Buchner funnel. The product crystals were washed first with absolute ethanol on the Buchner funnel then with anhydrous diethyl ether.

X in the above formula can be one or more appropriate counterbalancing anions such as fluoride, chloride, bromide, iodide, hydroxide, acetate, sulfate, carboxylate, etc.

Crystallization of the Dodecasil-1H can be carried out at either static or stirred conditions in a suitable reactor vessel, such as for example, polypropylene jars or teflon lined or stainless steel autoclaves. A useful range of temperatures for crystallization is from about 80° C. to about 250° C. for a time of about 12 hours to about 200 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. It should be realized that the reaction mixture component oxides can be supplied from more than one source. The reaction mixture can be prepared either batchwise or continuously. Crystal size and crystallization time of the Dodecasil-1H will vary with the nature of the reaction mixture employed and the crystallization conditions.

In all cases, synthesis of the Dodecasil-1H crystals may be facilitated by the presence of at least 0.01 percent, preferably 0.10 percent and still more preferably 1 percent, seed crystals (based on total weight) of crystalline product.

It will be readily understood by those of ordinary skill in the art that the above recitation of useful and preferred ranges of reactants does not constitute a warranty that all possible combinations of reactants falling within these ranges will automatically lead to the production of Dodecasil-1H. Accordingly, one must select reactants and crystallization conditions in a manner sufficient to lead to the formation of Dodecasil-1H. This selection will be readily enabled by the guidance provided herein, especially with regard to the examples and comparative examples recited hereinafter. In this regard, unsuccessful first attempts in the course of routine experimentation, which depart from the express reactant selectons and conditions of the examples recited hereinafter, could be followed by second attempts more closely corresponding with the express reactant selections and conditions of the examples recited hereinafter.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the case of many catalysts, it is desired to incorporate the Dodecasil-1H with another material resistant to the temperatures and other conditions employed in organic conversion processes. Such materials include active and inactive material and snythetic or naturally occurring zeolites as well as inorganic materials such as clays, silic and/or metal oxides, e.g. alumina. The latter may be either naturally occurring or in the form of a gelatinous precipitates or gels including mixtures of silica and metal oxides. Use of a material in conjunction with the Dodecasil-1H crystal, i.e. combined therwith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the Dodecasil-1H can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the zeolite content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented:

EXAMPLE 1

Crystallization was achieved utilizing a reaction mixture containing methylazabicyclononanium iodide, water, silica sol (30% $SiO_2$) and sodium hydroxide. No aluminum was added to the mixture. The mole ratio of $H_2O:SiO_2$ was 40. Crystallization was carried out in a stainless steel autoclave at 160° C., while stirring at autogenous pressure. Reaction conditions and results are summarized in Table 1.

TABLE 1

| Mixture Composition (Mole Ratios) | | | | | |
|---|---|---|---|---|---|
| $SiO_2$ / $Al_2O_3$ | $OH^-$ / $SiO_2$ | $Na^+$ / $SiO_2$ | R / $SiO_2$ | Days | Product |
| ∞ | 0.20 | 0.20 | 0.15 | 5 | Dodecasil-1H |

Table 2 sets forth X-ray diffraction data for the zeolite of Example 1.

TABLE 2

| Obsd 2θ | Obsd d-Spacing | Obsd I | Calcd 2θ | OBS-CALC |
|---|---|---|---|---|
| 7.36 | 12.011 | 2 | 7.38 | −0.02 |
| 7.89 | 11.191 | 1 | 7.88 | 0.01 |
| 10.80 | 8.194 | 2 | 10.80 | 0.00 |
| 12.79 | 6.290 | 8 | 12.80 | 0.00 |
| 14.80 | 5.977 | 11 | 14.79 | 0.01 |
| 15.04 | 5.892 | 25 | 15.04 | −0.01 |
| 15.80 | 5.610 | 16 | 15.79 | 0.00 |
| 16.78 | 5.283 | 100 | 16.77 | 0.01 |
| 17.44 | 5.084 | 32 | 17.45 | −0.01 |
| 19.60 | 4.529 | 14 | 19.60 | 0.00 |
| 21.15 | 4.200 | 9 | 21.15 | 0.00 |
| 21.71 | 4.014 | 2 | 21.70 | 0.01 |
| 22.25 | 3.996 | 6 | 22.26 | −0.01 |
| 23.65 | 3.762 | 27 | 23.64 | 0.01 |
| 24.99 | 3.563 | 6 | 24.93 | 0.06 |
| 25.28 | 3.524 | 48 | 25.27 | 0.01 |
| 25.76 | 3.459 | 14 | 25.75 | 0.00 |
| 26.84 | 3.322 | 28 | 26.82 | 0.02 |
| 26.97 | 3.306 | 22 | 26.97 | 0.00 |
| 27.09 | 3.293 | 20 | 27.10 | −0.01 |
| 28.12 | 3.173 | 13 | 28.12 | 0.00 |
| 29.83 | 2.995 | 2 | 29.82 | 0.01 |
| 31.02 | 2.883 | 2 | 31.00 | 0.01 |
| 31.28 | 2.860 | 3 | 31.28 | 0.00 |
| 32.56 | 2.750 | <1 | 32.57 | −0.01 |
| 32.81 | 2.730 | 2 | 32.80 | 0.01 |
| 33.95 | 2.641 | 1 | 33.92 | 0.03 |
| 35.30 | 2.543 | 6 | 35.32 | −0.03 |
| 36.40 | 2.468 | 7 | 36.39 | 0.01 |
| 37.53 | 2.396 | 4 | 37.53 | 0.01 |
| 38.46 | 2.341 | 2 | 38.50 | −0.04 |
| 39.05 | 2.307 | 2 | 39.06 | −0.01 |
| 39.24 | 2.296 | 4 | 39.24 | 0.00 |
| 40.73 | 2.215 | 3 | 40.73 | 0.00 |
| 40.88 | 2.207 | 1 | 40.90 | −0.02 |
| 41.42 | 2.180 | 1 | 41.44 | −0.01 |
| 42.36 | 2.134 | 1 | 42.33 | 0.02 |
| — | — | 0 | 45.41 | — |
| 46.19 | 1.965 | 2 | 46.17 | 0.02 |
| 46.90 | 1.937 | 4 | 46.90 | 0.00 |
| 48.37 | 1.882 | 2 | 48.37 | 0.00 |
| 48.99 | 1.859 | <1 | 49.01 | −0.01 |
| 49.90 | 1.828 | 2 | 49.90 | −0.01 |

The close corespondence between observed (Obsd) and calculated (Calcd) values for 2 theta will be noted in Table 2. These calculated values were calculated from a model constructed from the drawing in the aforementioned Gerke, Gies and Liebau article. The cell parameters for this Example 1 Dodecasil-1H were a = 13.836 Angstroms and c = 11.223 Angstroms as compared with a = 13.783 Angstroms and c = 11.223 Angstroms as reported by Gerke, Gies and Liebau in their article.

EXAMPLE 2

The procedure of Example 1 was repeated and Dodecasil-1H was obtained along with a trace of an unidentified second component.

EXAMPLE 3

The procedure of Example 1 was followed except that half the amount of NaOH was used, and the crystallization took place for 4 days instead of 5 days. Reaction conditions and results are summarized in Table 3.

TABLE 3

| Mixture Composition (Mole Ratios) | | | | | |
|---|---|---|---|---|---|
| $SiO_2$ / $Al_2O_3$ | $OH^-$ / $SiO_2$ | $Na^+$ / $SiO_2$ | R / $SiO_2$ | Days | Product |
| ∞ | 0.10 | 0.10 | 0.15 | 4 | Dodecasil-1H |

EXAMPLE 4

The procedure of Example 1 was followed with a few exceptions. For example, Q-brand sodium silicate (27.8 percent $SiO_2$; 8.4 percent $Na_2O$; 63.8 percent $H_2O$) was used in place of silica sol as the silica source. Further, modifications are apparent from Table 4, which summarizes the reaction conditions and results.

TABLE 4

| Mixture Composition (Mole Ratios) | | | | | |
|---|---|---|---|---|---|
| $SiO_2$ / $Al_2O_3$ | $OH^-$ / $SiO_2$ | $Na^+$ / $SiO_2$ | R / $SiO_2$ | Days | Product |
| ∞ | 0.10 | 0.59 | 0.11 | 4 | Dodecasil-1H |

Table 5 sets forth X-ray diffraction data for the zeolite of Example 4.

TABLE 5

| Obsd 2θ | Obsd d-Spacing | Obsd I | Calcd 2θ | OBS-CALC |
|---|---|---|---|---|
| 7.34 | 12.037 | 2 | 7.37 | −0.03 |
| 7.84 | 11.281 | 1 | 7.87 | −0.03 |
| 10.76 | 8.225 | 2 | 10.79 | −0.03 |
| 12.75 | 6.941 | 9 | 12.78 | −0.03 |
| 14.79 | 5.991 | 10 | 14.77 | 0.01 |
| 15.00 | 5.907 | 26 | 15.03 | −0.03 |
| 15.76 | 5.675 | 16 | 15.78 | −0.02 |
| 16.73 | 5.300 | 100 | 16.76 | −0.03 |
| 17.41 | 5.094 | 32 | 17.43 | −0.03 |
| 19.56 | 4.539 | 13 | 19.58 | −0.03 |
| 21.11 | 4.208 | 8 | 21.18 | −0.02 |
| 21.67 | 4.101 | 2 | 21.68 | −0.01 |
| 22.22 | 4.000 | 6 | 22.24 | −0.01 |
| 23.61 | 3.768 | 25 | 23.62 | −0.01 |
| 24.97 | 3.565 | 6 | 24.91 | 0.07 |
| 25.24 | 3.529 | 45 | 25.24 | −0.01 |
| 25.72 | 3.464 | 13 | 25.73 | −0.01 |
| 26.80 | 3.326 | 30 | 26.80 | 0.00 |
| 26.93 | 3.311 | 24 | 26.95 | −0.02 |
| 27.04 | 3.297 | 20 | 27.07 | −0.03 |
| 28.09 | 3.177 | 13 | 28.09 | 0.00 |
| 29.79 | 2.300 | 2 | 29.80 | 0.00 |
| 30.99 | 2.886 | 2 | 30.97 | 0.01 |
| 31.26 | 2.862 | 3 | 31.25 | 0.01 |
| 32.57 | 2.749 | 1 | 32.54 | 0.03 |
| 32.77 | 2.733 | 2 | 32.77 | 0.00 |
| 33.90 | 2.544 | 1 | 33.89 | 0.01 |
| 35.27 | 2.545 | 6 | 35.28 | −0.01 |
| 36.36 | 2.471 | 6 | 36.36 | 0.00 |
| 37.50 | 2.398 | 4 | 37.49 | 0.00 |
| 38.41 | 2.343 | 2 | 38.46 | −0.05 |
| 39.03 | 2.308 | 3 | 39.02 | 0.01 |
| 39.21 | 2.298 | 4 | 39.20 | 0.01 |

TABLE 5-continued

| Obsd 2θ | Obsd d-Spacing | Obsd I | Calcd 2θ | OBS-CALC |
|---|---|---|---|---|
| 40.69 | 2.217 | 2 | 40.69 | 0.00 |
| 40.84 | 2.210 | 1 | 40.86 | −0.02 |
| 41.42 | 2.180 | 1 | 41.39 | 0.03 |
| 42.31 | 2.136 | 1 | 42.28 | 0.03 |
| 45.38 | 1.998 | 1 | 45.37 | 0.01 |
| 46.16 | 1.966 | 2 | 46.12 | 0.04 |
| 46.86 | 1.939 | 3 | 46.85 | 0.01 |
| 48.34 | 1.883 | 2 | 48.33 | 0.01 |
| 48.94 | 1.861 | 1 | 48.96 | −0.02 |
| 49.86 | 1.830 | 1 | 49.86 | 0.00 |

The cell parameters for this Example 4 Dodecasil-1H were a = 13.848 Angstroms and c = 11.235 Angstroms.

It is apparent from SEM photomicrographs of the zeolites of Examples 1, 3 and 4 that the crystal morphologies of the product Dodecasil-1H are different and very sensitive to the composition of the hydrogel.

EXAMPLE 5

The procedure of Example 4 was followed. In this preparation $Al_2(SO_4)_3 \cdot 16H_2O$ was employed as the aluminum source in the hydrogel. Reaction conditions and results are summarized in Table 6.

TABLE 6

| | Mixture Composition (Mole Ratios) | | | | |
|---|---|---|---|---|---|
| $SiO_2$/$Al_2O_3$ | $OH^-$/$SiO_2$ | $Na^+$/$SiO_2$ | R/$SiO_2$ | Days | Product |
| 500 | 0.20 | 0.59 | 0.15 | 5 | Dodecasil-1H |

COMPARATIVE EXAMPLE A

The procedure of Example 1 was followed with a few exceptions. For example, sodium aluminate was added to the mixture along with the other components. ZSM-5 was produced at this $SiO_2$/$Al_2O_3$ range instead of Dodecasil-1H. Reaction conditions and results are summarized in Table 7.

TABLE 7

| | Mixture Composition (Mole Ratios) | | | | |
|---|---|---|---|---|---|
| $SiO_2$/$Al_2O_3$ | $OH^-$/$SiO_2$ | $Na^+$/$SiO_2$ | R/$SiO_2$ | Days | Product |
| 90 | 0.30 | 0.30 | 0.15 | 5 | 100% ZSM-5 |

COMPARATIVE EXAMPLE B

The procedure of comparative Example B was followed with the modifications apparent from Table 8, which summarizes the reaction conditions and results.

TABLE 8

| | Mixture Composition (Mole Ratios) | | | | |
|---|---|---|---|---|---|
| $SiO_2$/$Al_2O_3$ | $OH^-$/$SiO_2$ | $Na^+$/$SiO_2$ | R/$SiO_2$ | Days | Product |
| 90 | 0.20 | 0.22 | 0.20 | 5 | 100% ZSM-5 |

Table 9 is a compilation of the reaction, conditions, and results set forth in Tables 1, 3, 4 and 6–8.

TABLE 9

| | Reaction Conditions and Results | | | | | |
|---|---|---|---|---|---|---|
| 160° C.; stirred | Mixture Composition (Mole Ratios)[a] | | | | Time Days | Product |
| | $SiO_2$/$Al_2O_3$ | $OH^-$/$SiO_2$ | $Na^+$/$SiO_2$ | $R^b$/$SiO_2$ | | |
| Example 1[c] | infinity | 0.20 | 0.20 | 0.15 | 5 | Dodecasil-1H |
| Example 2[c] | infinity | 0.20 | 0.20 | 0.15 | 5 | Dodecasil-1H + trace second component |
| Example 3[c] | infinity | 0.10 | 0.10 | 0.15 | 4 | Dodecasil-1H |
| Example 4[d] | infinity | 0.10 | 0.59 | 0.11 | 4 | Dodecasil-1H |
| Example 5[e] | 500 | 0.20 | 0.59 | 0.15 | 5 | Dodecasil-1H |
| Comparative A[f] | 90 | 0.30 | 0.30 | 0.15 | 5 | 100% ZSM-5 |
| Comparative B[f] | 90 | 0.20 | 0.22 | 0.20 | 5 | 100% ZSM-5 |

[a] $H_2O$/$SiO_2$ = 40
[b] R = methylazabicyclononanium iodide
[c] Silica sol (30% $SiO_2$); no added $Al_2O_3$
[d] Q-brand sodium silicate; no added $Al_2O_3$
[e] Q-brand sodium silicate; $Al_2(SO_4)_3 \cdot 16 H_2O$
[f] Silica sol (30% $SiO_2$); $NaAlO_2$

What is claimed is:

1. A method for preparing a Dodecasil-1H zeolite which comprises preparing a mixture capable of forming said zeolite, said mixture comprising sources of alkali or alkaline earth metal ions, an oxide of aluminum, an oxide of silicon, a methylazabicyclononanium cation and water, said mixture having a composition, in terms of moles of ions or oxides, falling within the following ranges:

$SiO_2$/$Al_2O_3$ = 200–infinity
$H_2O$/$SiO_2$ = 5–200
$OH^-$/$SiO_2$ = 0–0.80
M/$SiO_2$ = 0.01–2.0
R/$SiO_2$ = 0.01–2.0 wherein R is the methylazabicyclononanium cation, and M is the alkali or alkaline earth metal ion, said method further comprising maintaining said mixture under sufficient conditions until said zeolite is formed.

2. A method according to claim 1, wherein said mixture has a composition, in terms of moles of ions or oxides, falling within the following ranges:

$SiO_2$/$Al_2O_3$ = 300–20,000
$H_2O$/$SiO_2$ = 20–200
$OH^-$/$SiO_2$ = 0.05–0.40
M/$SiO_2$ = 0.10–1.0
R/$SiO_2$ = 0.05–1.0

3. A method according to claim 2, wherein said mixture further comprises a sufficient amount of Dodecasil-1H formation enhancing seed crystals.

4. A method according to claim 1, wherein said mixture is essentially free of aluminum and has a composition, in terms of moles of ions or oxides, as follows:

$OH^-$/$SiO_2$ = 0.20
$Na^+$/$SiO_2$ = 0.20
R/$SiO_2$ = 0.15

5. A method according to claim 1, wherein said mixture is essentially free of aluminum and has a composition, in terms of moles of ions or oxides, as follows:
$OH^-/SiO_2 = 0.10$
$Na^+/SiO_2 = 0.10$
$R/SiO_2 = 0.15$ 6. A method according to claim 1, wherein said mixture is essentially free of aluminum and has a composition, in terms of moles of ions or oxides, as follows:
$OH^-/SiO_2 = 0.10$
$Na^+/SiO_2 = 0.59$
$R/SiO_2 = 0.11$ 7. A method according to claim 1, wherein said mixture has a composition, in terms of moles of ions or oxides, as follows:
$SiO_2/Al_2O_3 = 500$
$OH^-/SiO_2 = 0.20$
$Na^+SiO_2 = 0.59$
$R/SiO_2 = 0.15$ 8. A mixture capable of forming a Dodecasil-1H zeolite upon crystallization, said mixture comprising sources of alkali or alkaline earth metal ions, an oxide of aluminum, an oxide of silicon, a methylazabicyclononanium cation and water, said mixture having a composition, in terms of moles of ions or oxides, falling within the following ranges:
$SiO_2/Al_2O_3 = 200\text{-infinity}$
$H_2O/SiO_2 = 5\text{-}200$
$OH^-/SiO_2 = 0\text{-}0.80$
$M/SiO_2 = 0.01\text{-}2.0$
$R/SiO_2 = 0.01\text{-}2.0$
wherein R is the methylazabicyclononanium cation and M is the alkali or alkaline earth metal ion.

9. A mixture according to claim 8, wherein said mixture has a composition, in terms of moles of ions or oxides, falling within the following ranges:
$SiO_2/Al_2O_3 = 300\text{-}20{,}000$
$H_2O/SiO_2 = 20\text{-}200$
$OH^-/SiO_2 = 0.05\text{-}0.40$
$M/SiO_2 = 0.10\text{-}1.0$
$R/SiO_2 = 0.05\text{-}1.0$ 10. A mixture according to claim 9, wherein said mixture further comprises a sufficient amount of Dodecasil-1H formation enhancing seed crystals.

11. A mixture according to claim 8, wherein said mixture is essentially free of aluminum and has a composition, in terms of moles of ions or oxides, as follows:
$OH^-/SiO_2 = 0.20$
$Na^+/SiO_2 = 0.20$
$R/SiO_2 = 0.15$ 12. A mixture according to claim 8, wherein said mixture is essentially free of aluminum and has a composition, in terms of moles of ions or oxides, as follows:
$OH^-/SiO_2 = 0.10$
$Na^+/SiO_2 = 0.10$
$R/SiO_2 = 0.15$ 13. A mixture according to claim 8, wherein said mixture is essentially free of aluminum and has a composition, in terms of moles of ions or oxides, as follows:
$OH^-/SiO_2 = 0.10$
$Na^+/SiO_2 = 0.59$
$R/SiO_2 = 0.11$ 14. A mixture according to claim 8, wherein said mixture has a composition, in terms of moles of ions or oxides, as follows:
$SiO_2/Al_2O_3 = 500$
$OH^-/SiO_2 = 0.20$
$Na^+/SiO_2 = 0.59$
$R/SiO_2 = 0.15$ 15. A synthetic crystalline zeolite Dodecasil-1H material in the as-synthesized form having a formula, in terms of moles of oxides, in the anhydrous state as follows:
$(0.01\text{-}5)R_2O:(0\text{-}3)M_{2/n}O:(0.4 \text{ or less})Al_2O_3:(100)SiO_2$
where R is a methylazabicyclononanium cation, M is an alkali or alkaline earth metal ion and n is the valence of M.

* * * * *

UNITED STATES PATENT AND TRADEMARK OFFICE
CERTIFICATE OF CORRECTION

PATENT NO. : 4,562,166

DATED : December 31, 1985

INVENTOR(S) : Ernest W. Valyocsik

It is certified that error appears in the above-identified patent and that said Letters Patent is hereby corrected as shown below:

Col. 5, line 62, "corespondence" should be --correspondence--.

Col. 6, lines 63-64, 33.90 "2.544" should be 33.90 --2.644--.

Col. 8, line 65, Claim 4, "ofions" should be --of ions--.

Signed and Sealed this

Twenty-seventh Day of May 1986

[SEAL]

Attest:

DONALD J. QUIGG

Attesting Officer

Commissioner of Patents and Trademarks